US010780977B2

(12) United States Patent
Baines et al.

(10) Patent No.: US 10,780,977 B2
(45) Date of Patent: *Sep. 22, 2020

(54) AERODYNAMIC CONTROL SURFACE MOVEMENT MONITORING SYSTEM

(71) Applicant: Hamilton Sundstrand Corporation, Windsor Locks, CT (US)

(72) Inventors: Andrew N. Baines, Rockton, IL (US); Cory M. Crandall-Seibert, Delavan, WI (US); Victor Barger, Lake in the Hills, IL (US); William E. Leden, Roscoe, IL (US); David K. Boe, Kirkland, WA (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 435 days.

This patent is subject to a terminal disclaimer.

(21) Appl. No.: 15/433,021

(22) Filed: Feb. 15, 2017

(65) Prior Publication Data

US 2017/0233095 A1 Aug. 17, 2017

Related U.S. Application Data

(60) Provisional application No. 62/296,459, filed on Feb. 17, 2016.

(51) Int. Cl.
*B64C 13/28* (2006.01)
*B64C 9/16* (2006.01)
(Continued)

(52) U.S. Cl.
CPC .............. *B64C 13/28* (2013.01); *B64C 9/02* (2013.01); *B64C 9/16* (2013.01); *B64C 9/18* (2013.01);
(Continued)

(58) Field of Classification Search
CPC .......... B64D 45/0005; B64D 2045/001; B64C 13/00; B64C 9/16; B64C 9/02;
(Continued)

(56) References Cited

U.S. PATENT DOCUMENTS

| 4,598,888 A | * | 7/1986 | Beteille | B64C 39/12 244/178 |
| 4,947,077 A | * | 8/1990 | Murata | H02N 2/0025 310/317 |

(Continued)

FOREIGN PATENT DOCUMENTS

| EP | 2392510 A1 | 12/2011 | |
| EP | 2695810 A1 * | 2/2014 | B64C 13/28 |

(Continued)

OTHER PUBLICATIONS

European Search Report for Applicaiton No. 17156712.6-1754 dated May 17, 2017, 7 Pages.

*Primary Examiner* — Assres H Woldemaryam
(74) *Attorney, Agent, or Firm* — Cantor Colburn LLP

(57) ABSTRACT

An actuator system for controlling a flight surface of an aircraft includes a first actuator having a first actuator input and a first linear translation element that moves based on rotational motion received at the first actuator input and a first sensor coupled to the first linear translation element that generates a first output based on a displacement of the first linear translation element. The system also includes a second actuator having a second actuator input and a second linear translation element that moves based on rotational motion received at the second actuator input and a second sensor coupled to the second linear translation element that generates a second output based on a displacement of the second linear translation element. The system also includes a control unit that receives the first and second outputs and (Continued)

determines if an error condition exists for the system based on first and second output.

15 Claims, 3 Drawing Sheets

(51) Int. Cl.
  *B64C 9/02* (2006.01)
  *B64C 9/18* (2006.01)
  *B64C 13/40* (2006.01)
  *B64D 45/00* (2006.01)
  *B64C 9/14* (2006.01)

(52) U.S. Cl.
  CPC .......... *B64C 13/40* (2013.01); *B64D 45/0005* (2013.01); *B64C 2009/143* (2013.01); *B64D 2045/001* (2013.01); *Y02T 50/44* (2013.01)

(58) Field of Classification Search
  CPC .......... B64C 13/40; B64C 13/28; B64C 9/18; B64C 2009/143; Y02T 50/44
  See application file for complete search history.

(56) References Cited

U.S. PATENT DOCUMENTS

| | | | |
|---|---|---|---|
| 6,824,099 B1 | 11/2004 | Jones | |
| 8,989,953 B2 | 3/2015 | Catt et al. | |
| 9,108,724 B2 | 8/2015 | Rechsiek et al. | |
| 9,605,736 B1* | 3/2017 | Foshage | F16H 25/2252 |
| 9,682,769 B2* | 6/2017 | Richter | B64C 13/30 |
| 2004/0036887 A1* | 2/2004 | Kitahara | G01S 17/32 356/486 |
| 2010/0116929 A1 | 5/2010 | Hejda | |
| 2011/0062282 A1* | 3/2011 | Richter | B64C 13/42 244/99.4 |
| 2013/0009017 A1* | 1/2013 | Thompson | B64C 13/503 244/213 |
| 2014/0042269 A1* | 2/2014 | Zantz | B64C 13/28 244/99.3 |
| 2015/0197347 A1* | 7/2015 | Moy | B64D 45/00 701/33.9 |
| 2015/0279539 A1* | 10/2015 | Blanding | H01F 7/123 335/228 |
| 2015/0336683 A1* | 11/2015 | Neb | B64C 9/00 701/4 |
| 2016/0195115 A1* | 7/2016 | Fenn | B64C 25/30 92/82 |
| 2016/0355253 A1* | 12/2016 | Nfonguem | F16D 37/008 |
| 2017/0088251 A1* | 3/2017 | Nfonguem | B64C 13/28 |
| 2017/0233095 A1* | 8/2017 | Baines | B64C 9/02 244/99.3 |
| 2018/0156293 A1* | 6/2018 | Fox | F16F 15/073 |

FOREIGN PATENT DOCUMENTS

| | | |
|---|---|---|
| EP | 2695810 A1 | 2/2014 |
| EP | 1785346 A2 | 5/2017 |

* cited by examiner

AERODYNAMIC CONTROL SURFACE MOVEMENT MONITORING SYSTEM

CROSS REFERENCE TO RELATED APPLICATIONS

This application claims the benefit of an earlier filing date from U.S. Provisional Application Ser. No. 62/296,459 filed Feb. 17, 2016, the entire disclosure of which is incorporated herein by reference.

BACKGROUND OF THE INVENTION

Modern aircraft often use a variety of high lift leading and trailing edge devices to improve high angle of attack performance during various phases of flight, for example, takeoff and landing. One such device is a trailing edge flap. Current trailing edge flaps generally have a stowed position in which the flap forms a portion of a trailing edge of a wing, and one or more deployed positions in which the flap extends forward and down to increase the camber and/or plan form area of the wing. The stowed position is generally associated with low drag at low angles of attack and can be suitable for cruise and other low angle of attack operations. The extended position(s) is/are generally associated with improved air flow characteristics over the aircraft's wing at higher angles of attack.

Proper extension and retraction of such flaps is important for control of the aircraft during different maneuvers. As such, it is conventional to include multiple feedback systems to monitor flap deployment and retraction. For example, sensor systems may monitor absolute flap position, flap skew position and detection of a jam or disconnected actuator.

In general, such systems can include a control unit that causes a main drive unit to produce rotation of a shaft. This rotation can then be converted to flap extension in known manners such as by use of a ball screw. In such systems, each flap typically includes two actuators, one for each side of the flap. If the two actuators do not extend two sides of the flap the same amount, the flap experiences skew. Further, in some cases, the actuator may not be working effectively and determination of such, as well as skew, may be beneficial.

BRIEF DESCRIPTION

According to an embodiment, an actuator system for controlling a flight surface of an aircraft is disclosed. The system includes a first actuator having a first actuator input and a first linear translation element that moves based on rotational motion received at the first actuator input and a first sensor coupled to the first linear translation element that generates a first output based on a displacement of the first linear translation element. The system also includes a second actuator having a second actuator input and a second linear translation element that moves based on rotational motion received at the second actuator input and a second sensor coupled to the second linear translation element that generates a second output based on a displacement of the second linear translation element. The system further includes a control unit that receives the first and second outputs and determines if an error condition exists for the system based on first and second output.

In the actuator system of any prior embodiment the flight surface can be a flap.

In the actuator system of any prior embodiment the error condition is a flap skew condition and is determined when the signals from the first and second sensors do not match.

In the actuator system of any prior embodiment, the system can further include: a drive shaft coupled to the first input and the second input; a drive unit that causes the drive shaft to rotate based on signals received from the control unit.

In the actuator system of any prior embodiment, the error can be an actuator malfunction and is determined when a drive shaft's rotation is not proportional to one of the first or second outputs.

In the actuator system of any prior embodiment, the first sensor can be is one of: a rotatory variable transformer, a liner variable transformer, a synchro/resolver or an encoder.

In the actuator system of any prior embodiment, the first linear translation element can be a ball screw.

In the actuator system of any prior embodiment, the first linear translation element can be a hydraulic actuator.

According to one embodiment, a method of controlling and monitoring an aircraft control surface is disclosed. The method includes: sending a control signal from a control unit to a drive to cause a drive shaft to rotate; generating a first output with a first sensor coupled to a first linear translation element of a first actuator, the first output being based an amount of linear motion of the first linear translation element; generating a second output with a second sensor coupled to a second linear translation element of a second actuator, the second output being based an amount of linear motion of the first linear translation element; comparing an expected sensor outputs to the first and second outputs with the control to determine if an error condition exists; and generating an error indication when the error condition exists.

In the method of any prior embodiment, the flight surface can be a flap.

In the method of any prior embodiment, the error condition can be a flap skew condition and is determined when the signals from the first and second sensors do not match.

In the method of any prior embodiment, the error can be an actuator malfunction and is determined when a drive shaft rotations is not proportion to one of the first or second outputs.

In the method of any prior embodiment, wherein the first sensor can be one of: a rotatory variable transformer, a liner variable transformer, a synchro/resolver or an encoder.

In the method of any prior embodiment, the first linear translation element can be a ball screw.

In the method of any prior embodiment, the first linear translation element can be a hydraulic actuator.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION OF INVENTION

Disclosed herein is an aerodynamic control surface movement monitoring system (also referred to as an actuator system herein) that provides feedback for an aircraft flap or slat or other movable aerodynamic control surface. The disclosed system provides a single solution for: a) positional location (i.e. feedback of the control surface position), b) skew position feedback of the control surface, and c) failure detection for a jam or failure of a portion of an actuation system configured to move the aerodynamic control surface. The system disclosed, by combining multiple functions, allows part count reduction, weight reduction and reliability improvement compared to conventional systems.

In one embodiment, a single or dual channel synchro/resolver or rotary variable differential transformer (RVDT) may be utilized as the sensor. Of course, other types of sensors such as a linear variable transformer (LVT) may also be used. The sensor is mechanically linked to an output portion of the actuator. A ball nut is an example of such an output portion. As the actuator delivers mechanical motion to the aerodynamic control surface (e.g., slat), the sensor provides a change in its electrical output that is proportional to distance moved by the output of the actuator and, consequently, the controlled surface. Detection of a jam or disconnected actuator is established when the sensor output is not proportional to the actuators input. As will be understood, the input can be determined by a control system that drives an input shaft as more fully described below.

The system may include two or more of the actuator/sensor combinations for each control surface. In one embodiment, a measurement of travel distance of the output of an actuator is used to measure control surface position and/or skew.

Figure 1:
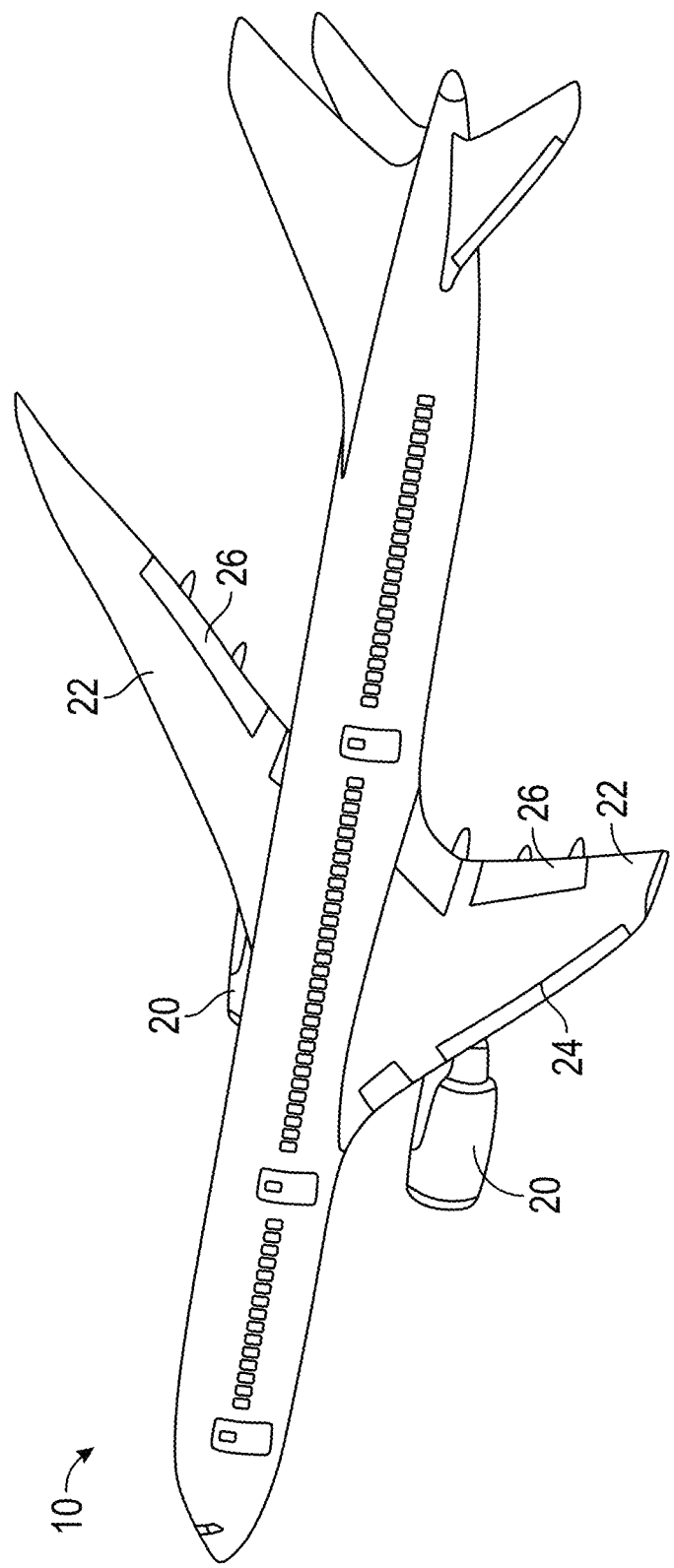
FIG. 1 is a perspective view of an aircraft that includes moveable control surfaces.

FIG. 1 illustrates an example of a commercial aircraft 10 having aircraft engines 20 that may embody aspects of the teachings of this disclosure. The aircraft 10 includes two wings 22 that each includes one or more slats 24 and one or more flaps 26. The term "control surface" used herein can refer to either a slat or a flap.

Figure 2:
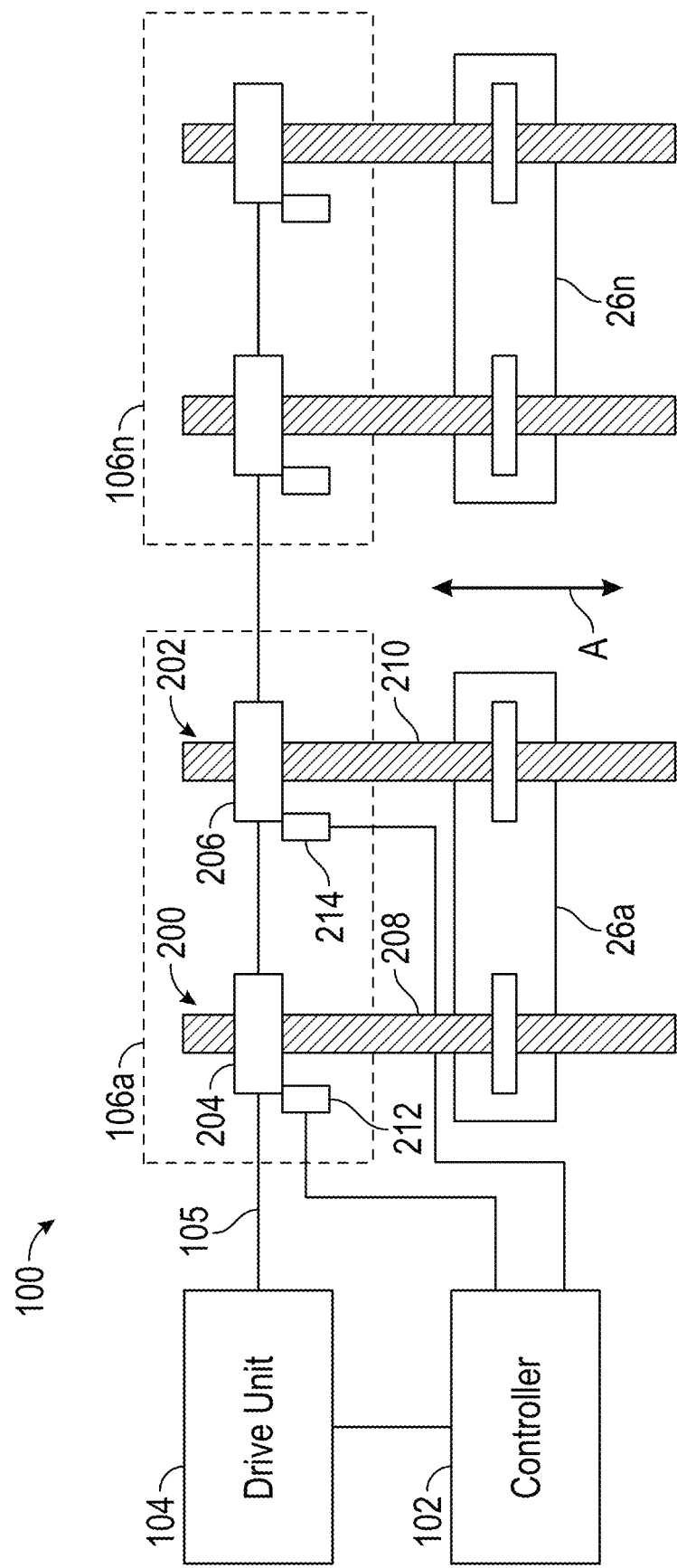
FIG. 2 is schematic of an actuator control system that includes one or more actuators having a positional sensor attached thereto.

FIG. 2 illustrates, generally, a system 100 that can control and monitor the location of one or more control surfaces of aircraft. As illustrated, the control surfaces are flaps 26. In particular, 2 flaps 26a, 26n are illustrated but any number of flaps could be controlled and monitored by the system 100. Further, while flaps 26 are illustrated, the same teachings herein can also applied to slats 24 shown in FIG. 1.

The system includes a controller 102. The controller 102 is configured to issue control commands to a drive unit 104. The commands can include commands to cause the drive unit 104 to rotate a drive shaft 105 in order to move one or more of the flaps 26 in either direction in or out as generally indicated by arrow A. To convert the rotary motion of the drive shaft 105 into linear motion to move the flaps 26s, one or more actuator units 106a . . . 106n are provided, with each flap or other control surface having its own actuator unit 106.

Each actuator unit 106 includes two actuators. For example, a first actuator unit 106a includes first and second actuators 200, 202. The first actuator 200 includes an actuator drive unit 204 and a linear translation element 208. The actuator drive unit 204 receives rotatory motion from the drive shaft 105 and causes the linear translation element 208 to move linearly in the direction shown generally by arrow A. Similarly, the second actuator 202 includes an actuator drive unit 206 and a linear translation element 210. The actuator drive unit 206 also receives rotatory motion from the drive shaft 105 and causes the linear translation element 210 to move linearly in the direction shown generally by arrow A. In one embodiment, the linear translation units 208, 210 are ball screws. In another, they may be hydraulic drive shafts.

Each actuator 202, 202 includes a sensor 212, 214 coupled thereto. The sensors measure a linear displacement of the linear translation elements 208, 210, respectively. The sensors could be any type of suitable sensor including a resolver, an LVT or an RVDT.

Figure 3:
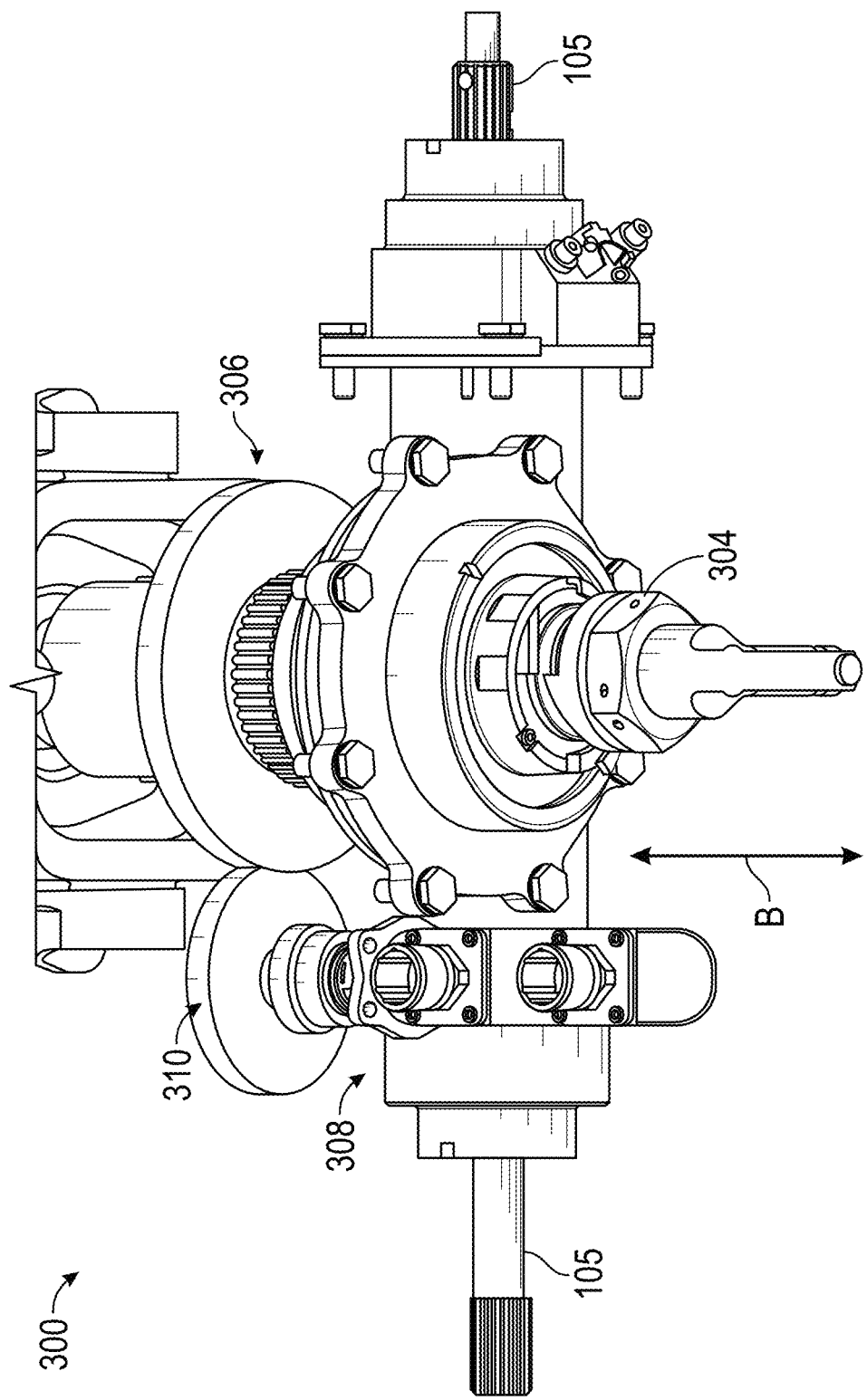
FIG. 3 shows a simplified example of an actuator according to one embodiment.

FIG. 3 illustrates a simplified version of actuator 300 that may be any actuator shown in FIG. 2. The actuator 300 can be connected to a drive shaft 105. The drive shaft can be controlled as described above. Rotation of the drive shaft causes the linear translator 304 to move in the direction shown by arrow B in a known manner. The linear translator 304 is illustrated as a ball screw but that is not required.

The actuator 300 includes a sensor 308. The illustrated sensor 308 is an RVDT that includes a rotational input 310 that contacts and rotates with gear 306 or other connection mechanism that rotates as the linear translator 304 rotates. In this manner, the linear motion of the linear translator can be measured. As illustrated, the sensor 308 includes two sensor units but only one is required. The second unit can be provided for redundancy.

Referring back now to FIG. 2, it shall be understood that each of the actuators 200, 202 could be the same or similar to that shown in FIG. 3 and, as such, the sensors 212, 214 or each actuator 200, 202 can measure the linear translation of the translating elements 208, 210. The output of the sensors is a voltage or other electrical measurement (e.g. current) and can be provided to the controller.

As stated above, the controller 102 issues commands to cause the drive unit 104 to rotate shaft 105. The rotation causes linear motion of the linear translating elements 208, 210. The amount of translation (e.g., the voltage output by the sensors) should be proportion to the amount of rotation of the shaft 105 in a properly operating actuator. Thus, the controller need only compare the amount of expected sensor output for a given drive unit 104 command signal to determine if either of the actuators 200, 202 is not operating properly.

If the outputs of both sensors 204, 206 fail to match the expected positions based on the actuator inputs then the system 100 (e.g., controller 102) determines that a jam or other actuator malfunction has occurred If the output of the two sensors does not match each other, then the controller attributes it to a skew condition. Additionally, the output of the two sensors provides a positional location information of the control surface 26.

Skew and actuator malfunction can generally be referred to as "error conditions" herein. These error conditions can be determined by comparisons to the sensor outputs and what is expected based on what the control unit instructs to the drive unit. For instance, the control unit 102 can instruct the drive unit 104 move the flaps to a fully extended position. This could mean that the drive unit 104 is to rotate the drive shaft 105 10 rotations. These to rotations should cause a proportional linear translation element (208, 210) motion which is measured by the sensors 212, 214. If they do not, an actuator jam or other failure could be determined to have existed. In such a case, the control unit 102 may generate an alarm that could be provided on a screen or other output device to an operator of the aircraft. Further, when the signals received from the sensors do not match, a flap 26 or other control surface skew condition may be determined and an alert as described above generated.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An actuator system for controlling a flight surface of an aircraft, the system comprising:
    a first actuator having a first actuator input and a first linear translation element that moves linearly based on rotational motion received at the first actuator input;
    a first sensor that includes a first rotational input coupled to the first linear translation element that measures linear motion of the first linear translation element based on rotation of the first linear translation element as it moves linearly and that generates a first output based on the linear motion of the first linear translation element;
    a second actuator having a second actuator input and a second linear translation element that moves linearly based on rotational motion received at the second actuator input;
    a second sensor that includes a second rotational input coupled to the second linear translation element that measures linear motion of the second linear translation element based on rotation of the second linear translation element as it moves linearly and that generates a second output based on the linear motion of the second linear translation element; and
    a control unit that receives the first and second outputs and determines if an error condition exists for the system based on first and second output.

2. The actuator system of claim 1, wherein the flight surface is a flap.

3. The actuator system of claim 2, wherein the error condition is a flap skew condition and is determined when the signals from the first and second sensors do not match.

4. The actuator system of claim 1, further comprising:
    a drive shaft coupled to the first input and the second input; and
    a drive unit that causes the drive shaft to rotate based on signals received from the control unit.

5. The actuator system of claim 4, wherein the error is an actuator malfunction and is determined when a drive shaft's rotation is not proportional to one of the first or second outputs.

6. The actuator system of claim 1, wherein the first sensor is one of:
    a rotatory variable transformer, a liner variable transformer, a synchro/resolver or an encoder.

7. The actuator system of claim 1, wherein the first linear translation element is a ball screw.

8. The actuator system of claim 1, wherein the first linear translation element is a hydraulic actuator.

9. A method of controlling and monitoring an aircraft control surface, the method comprising:
    sending a control signal from a control unit to a drive to cause a drive shaft to rotate;
    generating a first output with a first sensor that includes a first rotational input coupled to a first linear translation element of a first actuator, the first sensor measuring linear motion of the first linear translation element based on rotation of the first linear translation element as it moves linearly and indicating an amount of linear motion of the first linear translation element;
    generating a second output with a second sensor coupled to a second linear translation element of a second actuator, the second sensor measuring linear motion of the second linear translation element based on rotation of the second linear translation element as it moves linearly and indicating an amount of linear motion of the second linear translation element;
    comparing an expected sensor outputs to the first and second outputs with the control to determine if an error condition exists; and
    generating an error indication when the error condition exists.

10. The method of claim 9, wherein the flight surface is a flap.

11. The method of claim 9, wherein the error condition is a flap skew condition and is determined when the signals from the first and second sensors do not match.

12. The actuator system of claim 9, wherein the error is an actuator malfunction and is determined when a drive shaft rotations is not proportion to one of the first or second outputs.

13. The method of claim 9, wherein the first sensor is one of: a rotatory variable transformer, a liner variable transformer, a synchro/resolver or an encoder.

14. The method of claim 9, wherein the first linear translation element is a ball screw.

15. The method of claim 9, wherein the first linear translation element is a hydraulic actuator.

* * * * *